United States Patent Office 2,946,812
Patented July 26, 1960

2,946,812
SYNTHESIS OF STEROIDS

Josef Fried, Princeton, N.J., and Gordon H. Thomas, Birmingham, England, assignors to Olin Mathieson Chemical Corporation, New York, N.Y., a corporation of Virginia No Drawing. Filed Aug. 1, 1958, Ser. No. 752,443

16 Claims. (Cl. 260—397.45)

This invention relates to, and has for its object the provision of, a method of preparing physiologically active steroids and to the physiologically active steroids produced thereby.

The steroids of this invention include the ether derivatives of 16α-hydroxy steroids of the androstane series and, more particularly, steroids of the general formula

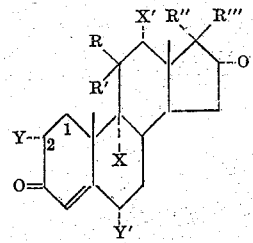

wherein the 1,2-position is saturated or double-bonded; R is hydrogen, R' is β-hydroxy, or together R and R' is keto; R" is hydrogen or lower alkyl, R'" is hydroxy, or together R" and R'" is keto; X and X' are hydrogen, halogen (i.e., fluorine, chlorine, bromine and iodine), hydroxy or lower alkoxy; at least one X being hydrogen; Y is hydrogen or methyl; Y' is hydrogen, fluoro or methyl; and Q is alkyl or aralkyl.

The compounds of this invention are prepared by interacting a steroid of the general formula

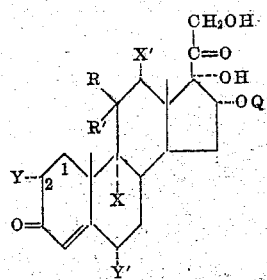

wherein the 1,2-position is saturated or double-bonded, and R, R', X, X', Y, Y' and Q are as hereinbefore defined, with an oxidizing agent containing a hexavalent chromium (e.g., chromium trioxide). Simultaneous with the oxidative removal of the side chain, the 11β-hydroxy group, if present, is oxidized to the 11-keto group, thereby directly yielding an 11,17-diketo steroid derivative.

The 11,17-diketo steroids, thus formed, can then be reacted with a reducing agent, such as a complex metal hydride (e.g., sodium borohydride). If a large excess of reducing agent is used, the corresponding 11β,17β-dihydroxy derivative is obtained. If, however, only a slight excess, for example, two equivalents of reducing agent, is used, then an 11-keto-17β-hydroxy derivative is formed. The 11,17-diketo steroids can also be converted to 3-ethylene ketals or enamine derivatives of a secondary base (e.g., pyrrolidine) in the usual manner; and the resulting derivatives, with the 3-keto group protected, can be reacted with a Grignard reagent (e.g., methyl magnesium iodide or ethyl magnesium bromide) to yield the corresponding 17α-(lower alkyl)-17β-hydroxy (e.g., 17α-methyl-17β-hydroxy and 17α-ethyl-17β-hydroxy) derivatives. These 17β-hydroxy steroids can then be esterified in the usual manner as by treatment with an acyl halide of acid anhydride in the presence of an organic base, such as pyridine. The preferred acylating agents are those of hydrocarbon carboxylic acids of less than ten carbon atoms, as exemplified by the acyl chlorides and acid anhydrides of the lower alkanoic acids (e.g., acetic anhydride, propionic anhydride and caproyl chloride), lower alkenoic acids, monocyclic aryl carboxylic acids (e.g., benzoyl chloride), the monocyclic aryl lower alkanoic acids (e.g., phenacetyl chloride and β-phenylpropionyl chloride), the cycloalkanecarboxylic acids, and the cycloalkenecarboxylic acids.

Suitable starting materials for the process of this invention are described in our U.S. application Serial No. 752,444, filed on even date herewith. These starting materials include the 16α-alkyl and aralkyl, preferably of less than ten carbon atoms as exemplified by the lower alkyl (e.g., methyl and ethyl), and monocyclic aryl (lower alkyl) (e.g., benzyl), ethers of 16α-hydroxyhydrocortisone, 16α-hydroxycortisone, 16α-hydroxyprednisolone, 16α-hydroxyprednisone, 9α-halo-16α-hydroxyhydrocortisone (e.g., 9α-fluoro-16α-hydroxyhydrocortisone), 9α - halo - 16α - hydroxycortisone, 9α - halo-16α - hydroxyprednisolone (e.g., 9α - fluoro - 16α-hydroxyprednisolone), 9α - halo - 16α - hydroxyprednisone, 12α - halo - 16α - hydroxyhydrocortisone (e.g., 12α-fluoro-16α-hydroxyhydrocortisone), 12α-halo-16α-hydroxycortisone (e.g., 12α-chloro-16α-hydroxycortisone), 12α - halo - 16α - hydroxyprednisolone, 12α - halo - 16α-hydroxyprednisone, 6α - methyl - 16α - hydroxyhydrocortisone, 6α-methyl-16α-hydroxycortisone, 6α-methyl-16α-hydroxyprednisolone, 6α-methyl-16α-hydroxyprednisone, 2α-methyl-16α-hydroxyhydrocortisone, 2α-methyl-16α-hydroxycortisone, 9α-halo-6α-methyl-16α-hydroxyhydrocortisone (e.g., 9α-fluoro-6α-methyl-16α-hydroxyhydrocortisone), 9α-halo-6α-methyl-16α-hydroxyprednisolone), 6α-fluoro-16α-hydroxyhydrocortisone, 6α-fluoro-16α-hydroxycortisone, 6α-fluoro-16α-hydroxyprednisolone, 6α-fluoro-16α-hydroxyprednisone, 6α-fluoro-9α-halo-16α-hydroxyhydrocortisone (e.g., 6α,9α-difluoro-16α-hydroxyhydrocortisone), 6α-fluoro-9α-halo-16α-hydroxycortisone, 6α-fluoro-9α-halo-16α-hydroxyprednisolone (e.g., 6α,9α-difluoro-16α-hydroxyprednisolone), and 6α-fluoro-9α-halo-16α-hydroxyprednisone. Particularly preferred steroid reactants are those wherein the 1,2-position is either saturated or double-bonded, R is hydrogen, R' is β-hydroxy or together R and R' is keto; X and X' are hydrogen, chlorine or fluorine, at least one X being hydrogen; Y is hydrogen; Y' is hydrogen or fluoro; and Q is lower alkyl or benzyl.

The compounds of this invention are physiologically active substances which possess androgenic and anabolic activities and hence can be used in lieu of known androgens, for example, such as testosterone propionate in the treatment of menopausal disturbances, for which purpose, they can be administered in the same manner as testosterone propionate, for example, the dosage being adjusted for the relative potency of the particular steroid.

The following examples are illustrative of the invention (all temperatures being in centigrade):

EXAMPLE 1

*9α-fluoro-16α-methoxy-Δ⁴-androstene-3,11,17-trione*

A solution of 150 mg. of 9α-fluoro-16α-methoxy-Δ⁴-pregnene-11β,17α,21-triol-3,20-dione in 15 ml. of acetone is oxidized with 0.85 ml. of a solution of chromium trioxide (200 mg.) and sulfuric acid (320 mg.) in water (1 ml.) for a period of 30 minutes. The mixture is then diluted with water and the steroid extracted with chloroform. The chloroform solution is washed with water, dried over sodium sulfate and the solvent removed in vacuo. The residue is dissolved in 10 ml. of benzene and adsorbed on 1.5 g. of acid-washed alumina. Elution of the column with 5% chloroform in benzene (200 ml.) yields crystalline material which, after recrystallization from acetone-hexane, furnishes pure 9α-fluoro-16α-methoxy-Δ⁴-androstene-3,11,17-trione of the following properties: M.P. about 213–216° (dec.); $[\alpha]_D^{23}$ +290° (c, 0.191 in chlf.);

$\lambda_{max}^{alc}$ 233 mμ (ε=16,300); $\lambda_{max}^{Nujol}$ 5.70, 5.79, 5.95, 6.16μ

*Analysis.*—Calcd. for $C_{20}H_{25}O_4F$ (348.40): C, 68.94; H, 7.23; F, 7.45; OMe, 8.91. Found: C, 68.89; H, 7.09; F, 5.27; OMe, 8.67.

EXAMPLE 2

*9α-fluoro-16α-ethoxy-Δ⁴-androstene-3,11,17-trione*

By substituting 150 mg. of 9α-fluoro-16α-ethoxy-Δ⁴-pregnene-11β,17α,21-triol-3,20-dione for the steroid reactant in Example 1, 9α-fluoro-16α-ethoxy-Δ⁴-androstene-3,11,17-trione is obtained.

EXAMPLE 3

*6α,9α-difluoro-16α-methoxy-Δ⁴-androstene-3,11,17-trione*

By substituting 160 mg. of 6α,9α-difluoro-16α-methoxy-Δ⁴-pregnene-11β,17α,21-triol-3,20-dione for the steroid reactant in Example 1, 6α,9α-difluoro-16α-methoxy-Δ⁴-androstene-3,11,17-trione is obtained.

EXAMPLE 4

*6α,9α-difluoro-16α-methoxy-Δ¹,⁴-androstadiene-3,11,17-trione*

By substituting 160 mg. of 6α,9α-difluoro-16α-methoxy-Δ¹,⁴-pregnadiene-11β,17α,21-triol-3,20-dione for the steroid reactant in Example 1, 6α,9α-difluoro-16α-methoxy-Δ¹,⁴-androstadiene-3,11,17-trione is obtained.

EXAMPLE 5

*9α-fluoro-16α-benzyloxy-Δ¹,⁴-androstadiene-3,11,17-trione*

By substituting 160 mg. of 9α-fluoro-16α-benzyloxy-Δ¹,⁴-pregnadiene-11β,17α,21-triol-3,20-dione for the steroid reactant in Example 1, 9α-fluoro-16α-benzyloxy-Δ¹,⁴-androstadiene-3,11,17-trione is obtained.

Similarly, any other 16-ether of a 16α,17α,21-trihydroxy steroid of the pregnane series, when substituted for the steroid reactant in Example 1, yields the corresponding androstane derivative.

EXAMPLE 6

*9α-fluoro-16α-methoxy-Δ⁴-androstene-11β,17β-diol-3-one*

To a solution of 173 mg. of 9α-fluoro-16α-methoxy-Δ⁴-androstene-3,11,17-trione in 10 ml. of absolute ethanol is added at room temperature 20 mg. of sodium borohydride and the resulting mixture stirred for one hour at 0°. Excess sodium borohydride is destroyed by the addition of ice-cold dilute hydrochloric acid and the solution concentrated in vacuo. Chloroform is added and after separation of the layers the chloroform extract is washed with water and dilute sodium bicarbonate solution, dried over sodium sulfate and the solvent removed in vacuo. The crystalline residue, after recrystallization from acetone-hexane, has the following properties: M.P. about 226.5–228.5°, $[\alpha]_D^{23}$ +58° (c, 0.25 in chlf.);

$\lambda_{max}^{alc}$ 238 mμ (ε=15,700); $\lambda_{max}^{Nujol}$ 2.95, 6.04, 6.17μ

*Analysis.*—Calcd. for $C_{20}H_{29}O_4F$ (352.43): C, 68.15; H, 8.29; OMe, 8.81. Found: C, 68.30; H, 8.36; OMe, 8.74.

Similarly, by following the procedure of Example 6, all other 17-keto steroids of this invention can be reduced to the corresponding 11β,17β-dihydroxy derivatives.

EXAMPLE 7

*9α-fluoro-16α-methoxy-Δ⁴-androstene-17β-ol-3,11-dione*

Following the procedure of Example 6 but employing only 10 mg. of sodium borohydride, 9α-fluoro-16α-methoxy-Δ⁴-androstene-17β-ol-3,11-dione is obtained.

Similarly, by following the procedure of Example 7, all other 11,17-diketo steroids can be reduced to the corresponding 17β-hydroxy-11-keto derivatives.

EXAMPLE 8

*9α-fluoro-16α-methoxy-Δ⁴-androstene-11β,17β-diol-3-one 17-acetate*

A solution of 50 mg. of 9α-fluoro-16α-methoxy-Δ⁴-androstene-11β,17β-diol-3-one in 1 ml. of pyridine and 1 ml. of acetic anhydride is allowed to stand at room temperature for 18 hours. Removal of the reagents in vacuo gives a crystalline residue of the 17-acetate.

Similarly, by substituting other acylating agents, such as propionic anhydride, caproyl chloride and benzoyl chloride for the acetic anhydride in Example 8, there is obtained the corresponding 17-ester derivatives.

The invention may be otherwise variously embodied within the scope of the appended claims.

What is claimed is:
1. A compound selected from the group consisting of steroids of the general formula

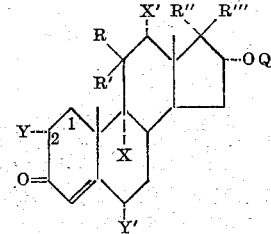

and the 1,2-dehydro derivatives thereof, wherein R is hydrogen, R' is β-hydroxy and together R and R' is keto; R'' is selected from the group consisting of hydrogen and lower alkyl, R''' is hydroxy, and together R'' and R''' is keto; X and X' are selected from the group consisting of hydrogen, halogen, hydroxy and lower alkoxy, at least one X being hydrogen; Y is selected from the group consisting of hydrogen and methyl; Y' is selected from the group consisting of hydrogen, fluoro and methyl; and Q is selected from the group consisting of lower alkyl and aralkyl of less than ten carbon atoms.

2. 9α-halo - 16α - (lower alkoxy) - Δ⁴ - androstene-3,11,17-trione.

3. 9α-fluoro - 16α - methoxy - Δ⁴ - androstene-3,11,17-trione.

4. 9α-fluoro - 16α - ethoxy - Δ⁴ - androstene-3,11,17-trione.

5. 6α-fluoro - 9α - halo - 16α - (lower alkoxy)-Δ⁴-androstene-3,11,17-trione.

6. 6α,9α-difluoro - 16α - methoxy - Δ⁴ - androstene-3,11,17-trione.

7. 6α-fluoro - 9α - halo - 16α - (lower alkoxy) - Δ¹,⁴-androstadiene-3,11,17-trione.

8. 6α,9α-difluoro - 16α - methoxy - Δ¹,⁴-androstadiene-3,11,17-trione.

9. 9α-halo - 16α - benzyloxy - Δ¹,⁴ - androstadiene-3,11,17-trione.

10. 9α-fluoro - 16α - benzyloxy - Δ¹,⁴ - androstadiene-3,11,17-trione.

11. 9α-halo - 16α - (lower alkoxy) - Δ⁴ - androstene-11β,17β-diol-3-one.

12. 9α - fluoro - 16α - methoxy - Δ⁴ - androstene-11β,17β-diol-3-one.

13. 9α - fluoro - 16α - methoxy - Δ⁴ - androstene - 17β-ol-3,11-dione.

14. 9α - fluoro - 16α - methoxy - Δ⁴ - androstene-11β,17β-diol-3-one 17-(lower alkanoate).

15. 9α - fluoro - 16α - methoxy - Δ⁴ - androstene-11β,17β-diol-3-one 17-acetate.

16. A process for preparing a compound selected from the group consisting of steroids of the general formula

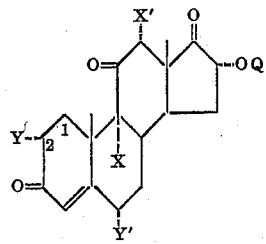

and the 1,2-dehydro derivatives thereof, wherein X and X' are selected from the group consisting of hydrogen, halogen, hydroxy and lower alkoxy, at least one X being hydrogen; Y is selected from the group consisting of hydrogen and methyl; Y' is selected from the group consisting of hydrogen, fluoro and methyl; and Q is selected from the group consisting of lower alkyl and aralkyl of less than ten carbon atoms, which comprises interacting a corresponding compound selected from the group consisting of steroids of the general formula

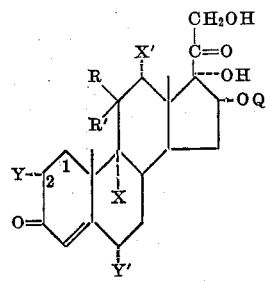

and the 1,2-dehydro derivatives thereof, wherein R is hydrogen, R' is β-hydroxy and together R and R' is keto; and X, X', Y, Y' and Q are as above defined, with a hexavalent chromium compound.

No references cited.